UNITED STATES PATENT OFFICE.

LOUIS L. JACKSON, OF NEW YORK, N. Y., ASSIGNOR OF ONE-HALF TO ODUS C. HORNEY, OF NEW YORK, N. Y.

PROCESS OF DECOMPOSING SILICATES.

1,233,273.     Specification of Letters Patent.     Patented July 10, 1917.

No Drawing.     Application filed June 16, 1916. Serial No. 103,973.

*To all whom it may concern:*

Be it known that I, LOUIS L. JACKSON, a citizen of the United States, residing at New York city, county of Queens, and State of New York, have invented a new and useful Improvement in Processes of Decomposing Silicates, of which the following is a full, clear, and exact description.

The object of this invention is to break up, by the action of suitable reagents, the combination existing in the silicates and to form new compounds which have a commercial value or which may be readily converted into commercially valuable forms. Alkali metals, if present in the silicate, are converted into compounds soluble in water, and the other elements into compounds soluble in, or decomposed by, dilute mineral or organic acids. By the thorough incorporation of the necessary reagents with the silicate, a reaction is brought about between the reagents and the silicate under physical conditions, such as temperature and pressure, that are moderate and by mechanical means readily obtained.

In a vessel capable of withstanding the pressure incident to the required temperature, is put a well-incorporated mixture, for example, of slaked lime, water and the ground silicate. The amount of alkaline reagent, in this case lime, should always be at least sufficient to combine with the acid elements of the silicate. The mass is raised by external heat under suitable control to the temperature required. The digestion should continue for a period of from six hours in some cases to a longer period in others, depending on the silicate. Increase in temperature hastens the reaction in many and probably in all cases. While I do not limit myself to a temperature of 200 C., I prefer to work at or below such temperature for mechanical reasons whenever possible. At the end of the digestion the contents of the vessel may either be treated as a whole, or the aqueous solution may be separated from the insoluble and sparingly soluble constituents and the solution and insoluble and sparingly soluble products separated from it treated separately. The entire content of the vessel as a whole, or the insoluble and sparingly soluble products obtained from it, may be treated with carbon-dioxid, or any desired acid, and dried and used as a fertilizer or fertilizer base. Certain constituents of the components of the insoluble mixture, for example, magnesium, aluminum, copper, nickel, or other elements can be removed by treatment with acids as soluble salts and recovered as salts or metals and the insoluble and sparingly soluble residue be used either direct or after making neutral or alkaline as a fertilizer or fertilizer base, thus offering a cheaper method for the extraction of some of these elements and also making possible the utilization of minerals not now used as sources of these elements or their salts.

The residue removed from the soluble portion of the product from the digesters may be utilized in other ways. For example:—in certain cases this residue will contain all the necessary constituents of cement, and in other cases, by adding the required substance or substances either before or after digestion, it may be made to contain such constituents and by proper treatment may be converted into a cement.

To illustrate the process by a specific case, I take 250 parts of finely ground feldspar, 250 parts of quick lime, and 2000 parts of water, though a larger excess of lime is no deterrent and may even be desired in the final product. After thorough incorporation of these substances in any suitable mixer the mixture is run into a digester, preferably a cylinder, capable of standing the pressure (about 200 lbs.) incident to the temperature 200 C., and provided with a stirrer which revolves slowly through the fluid mixture during digestion. The digester need be of no special design but may be of a type used in other processes The mixture or charge in the digester is raised, by carefully controlled external heat, to the required temperature and the digestion continues for a period varying with the feldspar used. About eight hours is sufficient to get a good commercial product. At the end of the digestion the charge is treated with $CO_2$ or other acid, forming a product part of which is soluble in water and the rest practically insoluble. These parts may be separated by filtration for the further treatment for subdivision, or the whole charge may be dried down for a fertilizer. The insoluble part, being a precipitate and therefore very finely divided, is eminently suited for plant assimilation or for the manufacture of cement. This character also fits it for further chemical action for the isolation of the metallic constituents as metals, hydrates or salts.

Where the mineral acted upon contains no alkali, as is the case with many substances, such as kaolin and soapstone, which have not been hitherto worked commercially for their metallic constituents, this process applies with advantage in releasing the desired metal or metals and in giving a residue of value as a fertilizer base.

One of the vital features of the process, and without which the results sought by my process cannot be obtained, is the employment of an amount of water, relatively either to the silicates or to the lime or to both, much in excess of that heretofore proposed. The amount of water added must be far in excess of that required to combine with the lime to form hydrate of lime. Further, a limited excess of water over that required to form hydrate of lime, such, for example, as the amount of water that it is necessary to add to form what is known as "milk of lime", will not accomplish the results sought. The minimum amount of water, by weight, must not be less than three and one half times the amount, by weight, of the lime. Inasmuch as about one part by weight of water will combine with about three parts by weight of calcium oxid to form calcium hydrate, the minimum amount of uncombined water must be about two and a half times the hydrate of lime. These percentages I have found not to give satisfactory commercial results; but the variety of materials that may be treated by my process is so great and the specific uses of the processes so varied, that the above minimum percentages may be deemed, in certain cases, to be within the range of theoretical possibility.

In order, however, to secure satisfactory commercial results in the treatment of the more common silicates, such as feldspar, I have found it necessary to use from five to ten times as much water as lime, so that, when mixed with the feldspar, the amount of uncombined water will be from three and one half to seven times the amount of the calcium hydrate.

While I have mentioned, and prefer ordinarily to use, calcium oxid, as the alkaline reagent, in an amount not less than approximately the weight of the silicate treated, I mean to include, as an equivalent reagent, other alkaline earth oxids and alkaline oxids or mixtures of oxids of alkalies and oxids of alkaline earths, provided they are used in molecularly equivalent parts. Thus I am aware that leucite has been treated with an equal weight of potassium hydrate and with water for the purpose of separating the silica from the alumina, but this amount of potassium hydrate is molecularly equivalent to an amount by weight of calcium oxid not over half the minimum proportionate quantity required, and less than half the minimum proportionate quantity desirable, in my process, to accomplish the results sought and obtained by me; whereas by the use, as a reagent, of an alkaline earth oxid in the minimum amount required in my process, the separation of the silica and the alumina by the alkaline method would be impossible.

Another feature of novelty in my process is that the water acts distinctly as a catalyst. Considered as a solvent of the lime the amount of water used is so small as to be inconsiderable. At the beginning of the reaction less than half of one per cent. of the total lime can be in solution. As the reaction progresses the alkali set free decreases the solubility of the lime until by the time the reaction is half over sufficient alkali has been produced to make the lime practically insoluble, when if the water acts solely as a lime solvent the reaction should stop. If the water acts as a catalyst the reaction should go on, and it does go on if the proper conditions for catalytic action are maintained. In order that a catalyst may work efficiently it is necessary that it should be able to get in contact with every molecule of the reagent and the substance to be acted upon. To make this possible in this case a certain amount of limpidity is necessary and a certain amount of agitation to prevent the occlusion of any reagent or any of the product to be acted on by the insoluble products formed in the reaction. The amount of water used, when water is considered as a catalyst, is out of all proportion to the amount which is theoretically necessary for catalytic action, but it so happens that, in this particular case, the only substance which it is practicable to add to produce the necessary limpidity is the catalyst itself.

I do not herein claim the process of treating the product of digestion with an acid such as carbon dioxid, as the same is described and claimed in an application filed by me of even date herewith, Serial No. 104,105; nor do I claim the product formed by said acid treatment, as the same is described and claimed in an application filed by me March 17, 1917, Serial No. 155,388.

Having now fully described my invention, what I claim and desire to protect by Letters Patent is:—

The process of treating silicates to break up the combination existing therein and form new compounds which comprises the treatment of the silicate with calcium oxid in an amount by weight not less than approximately the weight of the silicate and with water by weight not less than about five times the amount of the calcium oxid, and the subjection of the mixture to heat and pressure.

In testimony of which invention, I have hereunto set my hand, at New York, N. Y., on this 10th day of June, 1916.

LOUIS L. JACKSON.